J. WORRELL.
Wheel-Plows.

No. 137,044. Patented March 18, 1873.

Witnesses:
E. A. Bates.
Chas. B. Steele

Inventor:
John Worrell,
Chipman Hosmer & Co.
Attorneys

UNITED STATES PATENT OFFICE.

JOHN WORRELL, OF BELLEVILLE, INDIANA.

IMPROVEMENT IN WHEEL-PLOWS.

Specification forming part of Letters Patent No. 137,044, dated March 18, 1873.

*To all whom it may concern:*

Be it known that I, JOHN WORRELL, of Belleville, in the county of Hendricks and State of Indiana, have invented a new and valuable Improvement in Sulky-Plows; and I do hereby declare that the following is a full, clear, and exact description of the construction and operation of the same, reference being had to the annexed drawing making a part of this specification, and to the letters and figures of reference marked thereon.

Figure 1:
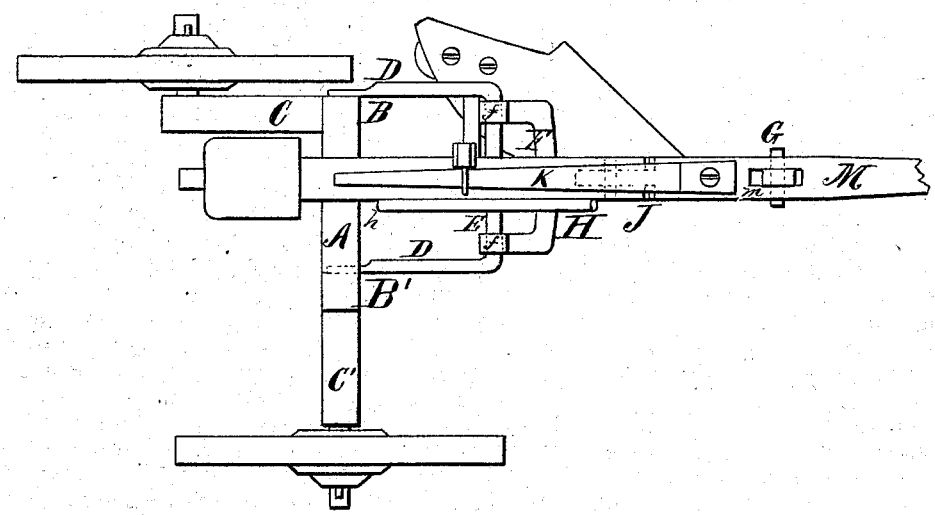
Figure 2:
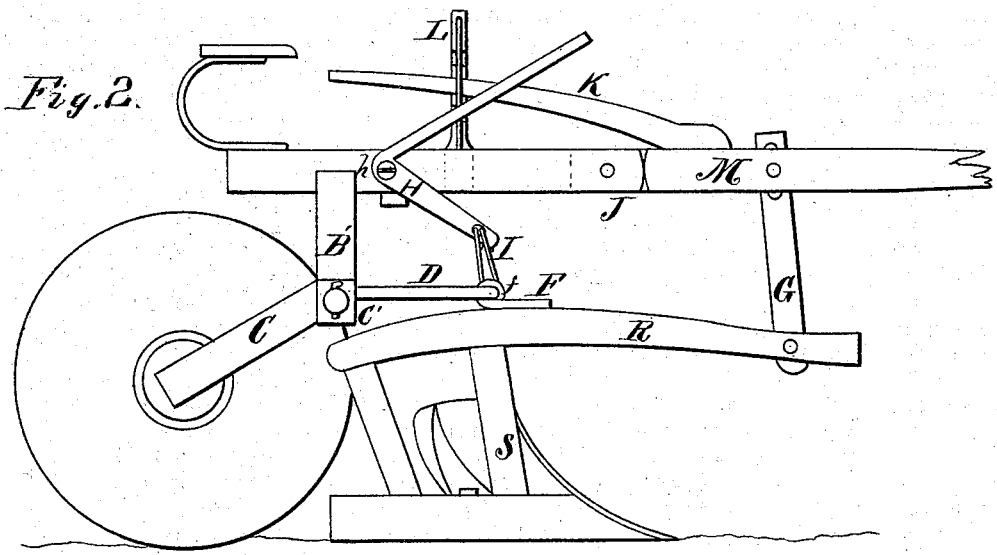

Figure 1 of the drawing is a representation of top-plan view of my invention. Fig. 2 is a side view of the same.

My invention relates to certain improvements in sulky attachments for plows, whereby the operator is enabled to control the movements of the plow while in motion, said improvements being applicable to any ordinary plow, the handles being removed. The nature of my invention consists in, first, an axle with two arms projecting vertically downward, one bent at a right angle and extending toward one side, and the other bent at an obtuse angle and extending downward and toward the rear, so that one wheel may run in the furrow immediately in the rear of the plow, while the other wheel runs on the unplowed ground; second, an adjusting-lever, in connection with a jointed pole or tongue, and their combination with the plow-beam and a connecting-bar for regulating the depth of furrow.

In the annexed drawing, A represents the axle, with two arms, B B', projecting vertically downward. One of these arms, B', is shown clearly in Fig. 2. The arm B' is bent at a right angle, and extends outward toward one side of the machine, as shown at C'. The arm B is bent at an obtuse angle, and extends downward and toward the rear in the same plane with said arm, as shown at C. By this arrangement the wheel on the extension C is made to run in the furrow immediately in rear of the plow, while the wheel on the extension C' runs on the unplowed ground. D D represent two arms running parallel with the plow-beam, having their rear ends pivoted to the vertical arms B B', and their front ends connected by a transverse bar, E, at or near a point immediately over the standard S; or the arms D D and transverse bar E may be made in one piece, or of a single rod of iron, bent as shown in Fig. 1. F represents a metallic plate, attached midway of its length to the plow-beam R, and extending on each side thereof for a short distance, and then bent at right angles, and having its ends turned up so as to form eyes *f f*, through which the transverse bar E passes. H is an elbow-lever, pivoted at *h* to the pole or tongue M, and having its short arm connected, by a link, rod, or chain, I, to the transverse bar E. By means of this arrangement the operator is enabled to raise and lower the plow without leaving his seat. The forward end of the plow-beam R is connected to the pole or tongue M by a bar, G, the upper end of which passes through a mortise, *m*, in the tongue, and is held in place by a bolt, being perforated at different points so as to be readily adjusted at different heights. The pole M is hinged or jointed at J so as to allow a vertical movement of the forward end. Attached rigidly to the tongue M, between the mortise *m* and joint J, is the front end of a lever, K, the rear end of which engages with the adjusting-notches of the bar L, and is thus held in different positions, as required.

By means of this arrangement and combination of devices the operator is enabled to regulate the depth of furrow while the plow is in motion, as well as the angular inclination of the plow-beam, without leaving his seat.

What I claim as my invention, and desire to secure by Letters Patent, is—

1. The axle A, having the arms B B' projecting vertically downward, one bent at a right angle and extending toward one side, and the other bent at an obtuse angle and extending downward and toward the rear, substantially as shown and described.

2. The combination of the lever K and notched bar L, jointed pole M, connecting-bar G, and plow-beam R, substantially as shown and described.

3. The combination, with the jointed pole and lever, of the elbow-lever H, radial hinge-brace D D E, plow-beam, and connecting devices I and G, substantially as specified.

In testimony that I claim the above I have hereunto subscribed my name in the presence of two witnesses.

JOHN WORRELL.

Witnesses:
A. C. EVANS,
E. H. CARTER.